United States Patent
Jung et al.

(10) Patent No.: US 7,778,309 B2
(45) Date of Patent: Aug. 17, 2010

(54) APPARATUS AND METHOD FOR CANCELING INTERFERENCE FROM NEIGHBOR CELLS IN BROADBAND COMMUNICATION SYSTEM

(75) Inventors: Yun-Ho Jung, Suwon-si (KR);
Yun-Sang Park, Suwon-si (KR);
Bong-Gee Song, Seongnam-si (KR);
Young-Hak Kim, Suwon-si (KR);
Byung-Tae Kang, Seoul (KR);
Min-Cheol Park, Suwon-si (KR);
In-Hyoung Kim, Yongin-si (KR);
Hae-Dong Yeon, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 848 days.

(21) Appl. No.: 11/643,340

(22) Filed: Dec. 20, 2006

(65) Prior Publication Data
US 2007/0147538 A1    Jun. 28, 2007

(30) Foreign Application Priority Data
Dec. 23, 2005    (KR) .................. 10-2005-0128471

(51) Int. Cl.
*H04L 27/30*    (2006.01)
(52) U.S. Cl. .................. 375/148; 375/267; 375/347; 375/349; 370/252; 370/464; 455/501; 455/63.1; 455/67.13; 455/226.1
(58) Field of Classification Search ............... 375/140, 375/141, 147, 144, 148, 267, 285, 346, 347, 375/349; 370/252, 464, 491, 319, 320, 342, 370/328; 455/501, 506, 63.1, 67.11, 67.13, 455/296, 303, 226.1, 226.2, 226.3
See application file for complete search history.

(56) References Cited

U.S. PATENT DOCUMENTS

| 6,751,187 | B2 * | 6/2004 | Walton et al. | 370/210 |
| 7,061,854 | B2 * | 6/2006 | Tarokh et al. | 370/206 |
| 7,120,395 | B2 * | 10/2006 | Tong et al. | 455/101 |
| 7,428,268 | B2 * | 9/2008 | Shen et al. | 375/267 |
| 7,590,200 | B2 * | 9/2009 | Fujii et al. | 375/347 |
| 2005/0157810 | A1 | 7/2005 | Raleigh et al. | |

FOREIGN PATENT DOCUMENTS

| EP | 1 530 335 | 5/2005 |
| JP | 8-84105 | 3/1996 |

(Continued)

*Primary Examiner*—Dac V Ha
(74) *Attorney, Agent, or Firm*—The Farrell Law Firm, LLP (57) ABSTRACT

An apparatus and method for canceling an interference signal in a broadband wireless communication system are provided. A receiver of a wireless communication system includes at least two receive antennas for receiving a target signal of a serving base station and interference signals of at least one neighbor base station; a channel estimator for estimating channels of the signals received through the receive antennas; and a detector for detecting the target signal using channel estimation values of the received signals. Accordingly, it is possible to reduce error propagation caused by the incorrect estimation and detection of the interference signal. In addition, time delay for detecting/restoring/removing the interference signal does not occur. Moreover, the increase of additional buffers can be prevented. Consequently, the increase of hardware complexity can be prevented.

13 Claims, 5 Drawing Sheets

FOREIGN PATENT DOCUMENTS

| | | |
|---|---|---|
| JP | 2002-199430 | 7/2002 |
| JP | 2002-208889 | 7/2002 |
| JP | 2002-217825 | 8/2002 |
| JP | 2003-218772 | 7/2003 |
| JP | 2004-201296 | 7/2004 |
| KR | 1020000032605 | 6/2000 |
| KR | 1020040035505 | 4/2004 |

* cited by examiner

APPARATUS AND METHOD FOR CANCELING INTERFERENCE FROM NEIGHBOR CELLS IN BROADBAND COMMUNICATION SYSTEM

PRIORITY

This application claims priority under 35 U.S.C. §119 to an application filed in the Korean Intellectual Property Office on Dec. 23, 2005 and allocated Ser. No. 2005-128471, the contents of which are incorporated herein by reference.

BACKGROUND OF THE INVENTION

1. Field of the Invention

The present invention relates generally to an apparatus and method for canceling interference from neighbor cells in a broadband wireless communication system, and in particular, to an apparatus and method for canceling interference from neighbor cells in a broadband wireless communication system using multiple receive (RX) antennas.

2. Description of the Related Art

A broadband wireless communication system uses a cellular system that divides the service coverage area into a plurality of small areas (i.e., cells) in order to overcome restrictions in a service coverage area and subscriber capacity. In the cellular system, two cells spaced apart from each other by a sufficient distance use the same frequency band, making it possible to reuse a frequency resource spatially. Accordingly, the cellular system increases the number of channels distributed spatially, thereby making it possible to secure a sufficient number of subscribers. However, a wireless communication system with a frequency reuse factor of 1 has a problem in that RX performance is degraded by interference between neighbor cells.

Figure 1:
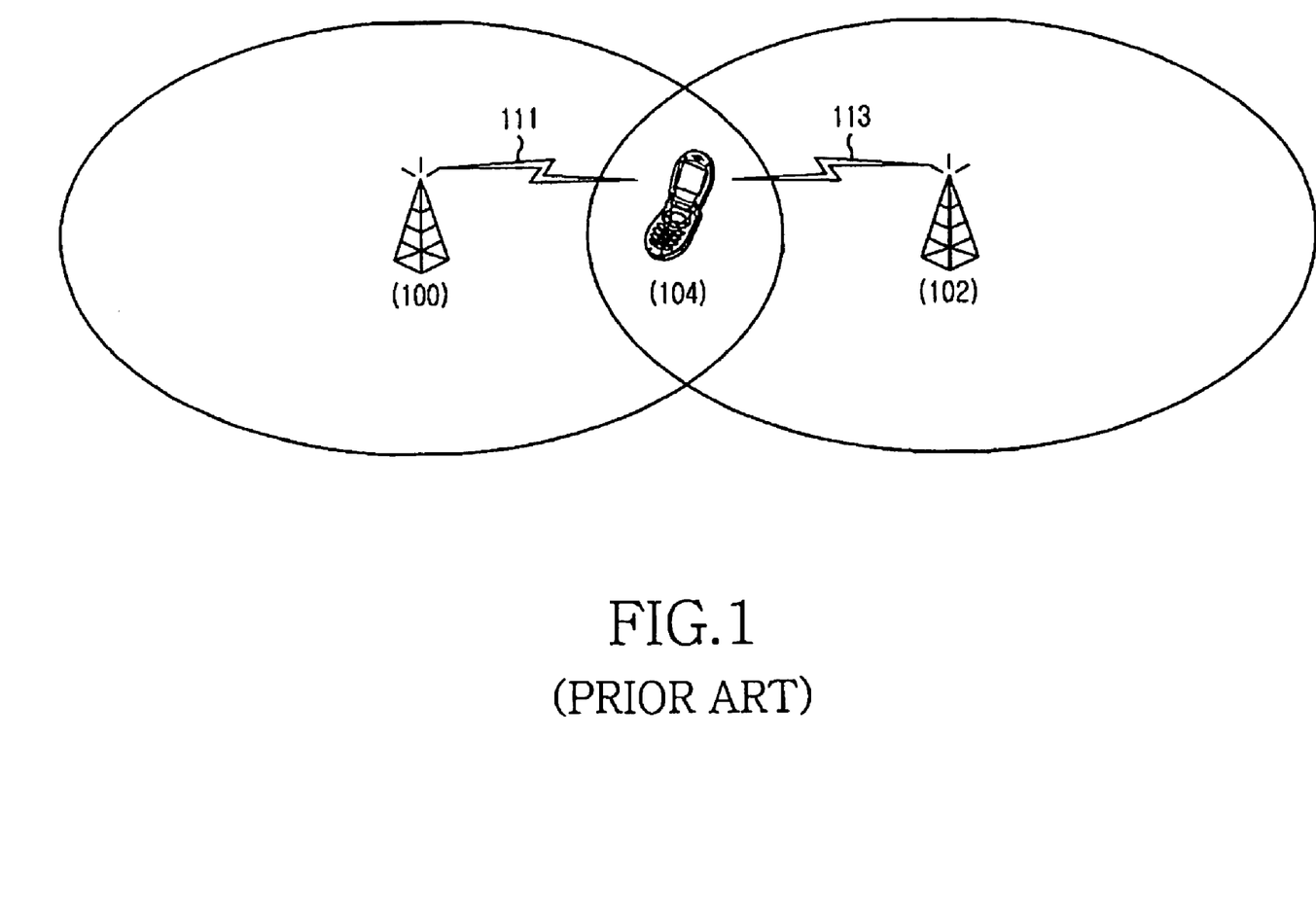
FIG. 1 illustrates a configuration of a conventional wireless communication system.

FIG. 1 is a diagram illustrating the structure of a general broadband wireless communication system.

Referring to FIG. 1, a mobile station (MS) 104 is located in the cell coverage of a serving base station (BS) 100 and communicates with the serving BS 100.

If the MS 104 moves into a handoff region (i.e., a cell boundary region), it receives not only a target signal 111 from the serving BS 100 but also an interference signal from a neighbor BS 102, as expressed in Equation (1):

$$y(k) = h_s(k) \cdot x_s(k) + h_I(k) \cdot x \cdot (k) + n(k) \tag{1}$$

where $h_s(k)$ is a channel corresponding to the $k^{th}$ subchannel between the serving BS 100 and the MS 104, $h_I(k)$ is a channel corresponding to the $k^{th}$ subchannel between the neighbor BS 102 and the MS 104, $x_s(k)$ is a signal received from the serving BS 100 over the $k^{th}$ subchannel, $x_I(k)$ is a signal received from the neighbor BS 102 over the $k^{th}$ subchannel, and $n(k)$ is an Additive White Gaussian Noise (AWGN) corresponding to the $k^{th}$ subchannel.

The interference signal received from the neighbor BS 102 causes a degradation in the RX performance of the MS 104. Research has been conducted to provide methods for reducing the RX performance degradation due to the interference signal in the broadband wireless communication system. For example, the MS 104 disregards the interference signal and detects the target signal. For example, the MS 104 cancels the interference signal using a Successive Interference Cancellation (SIC) scheme or a Parallel Interference Cancellation (PIC) scheme.

If the MS 104 is near to the serving BS 100 and far from the neighbor BS 102, the power of the interference signal received by the MS 104 is much smaller than that of the target signal. The MS 104 disregards the interference signal in a received signal expressed in Equation (1) to estimate and detect the target signal as expressed in Equation (2):

$$\tilde{x}_s(k) = h_s^{-1}(k) \cdot y(k), \hat{x}_s(k) = Q(\tilde{x}_s(k)) \tag{2}$$

where $\tilde{x}_s(k)$ is an estimated target signal component, $h_s(k)$ is a channel component of the serving BS 100 and the MS 104, $y(k)$ is the received signal, and $\hat{x}_s(k)$ is a detected target signal component.

However, when the MS 104 is located in a cell boundary region between the serving BS 100 and the neighbor BS 102, an interference signal and a target signal received at the MS 104 are similar in power. Accordingly, when the MS 104 disregards the interference signal to estimate and detect the target, signal performance degradation occurs due to the interference signal.

In the SIC scheme, the MS 104 estimates the interference signal and cancels the estimated interference signal from the received signal to detect the target signal. For example, using Equation (3) below, the MS 104 estimates a channel component between the neighbor BS 102 and the MS 104 to restore the interference signal.

$$\tilde{x}_I(k) = h_I^{-1}(k) \cdot y(k), \hat{x}_I(k) = Q(\tilde{x}_I(k)) \tag{3}$$

where $\tilde{x}_I(k)$ is an estimated component of the interference signal, $h_I(k)$ is a channel component of the neighbor BS 102 and the MS 104, $y(k)$ is the received signal, and $\hat{x}_I(k)$ is a detected target signal component.

Thereafter, by applying the restored interference signal to Equation (4) below, the MS 104 cancels the interference signal from the received signal to restore the target signal.

$$w(k) = y(k) - h_I^{-1}(k) \cdot \hat{x}_I(k) = h_s(k) \cdot x_s(k) + n'(k) \tag{4}$$

where $\hat{x}_I(k)$ is the detected interference signal, $h_I(k)$ is a channel component the neighbor BS 102 and the MS 104, and $y(k)$ is a received signal.

As expressed in Equation (4), the MS 104 cancels a neighbor signal component from the received signal and estimates and detects the target signal using the channel component of the serving BS 100.

If there are several interference signals, the MS 104 arranges the interference signals according to Carrier to Interference and Noise Ratios (CINRs), restores the interference signals serially, and cancels the restored interference signals from the received signal.

The PIC scheme restores an interference signal in the same way as the SIC scheme and cancels the restored interference signal from a received signal to detect a target signal. Unlike the SIC scheme, if there are several interference signals, the PIC scheme restores and cancels the interference signals in parallel.

As described above, the SIC scheme and the PIC scheme are interference cancellation schemes that restore the interference signal, cancel the restored interference signal from the received signal, and detect the target signal. However, when the interference signal is restored, the SIC scheme and the PIC scheme ignore the target signal, increasing the error probability of the restored interference signal. When the MS detects the target signal using the interference signal in which the error occurs, the error propagation is caused, degrading system performance.

In addition, the MS must find the Modulation and Coding Scheme (MCS) level of the interference signal in order to restore and cancel the interference signal. Therefore, the MS must demodulate and decode the interference signal. Consequently, the time delay occurs in the MS in order for the interference cancellation. Thus, the size of the buffer in the input terminal increases, causing an increase of hardware complexity.

SUMMARY OF THE INVENTION

An object of the present invention is to substantially solve at least the above problems and/or disadvantages and to provide at least the advantages below. Accordingly, an object of the present invention is to provide an apparatus and method for detecting a target signal component independently of interference signal components in a broadband wireless communication system.

Another object of the present invention is to provide an apparatus and method for detecting a target signal component independently of interference signal components by using multiple RX antennas in a broadband wireless communication system.

A further anther object of the present invention is to provide an apparatus and method for detecting a target signal component independently of interference signal components in a broadband wireless communication system, thereby reducing time delay and the use of additional buffers.

According to one aspect of the present invention, a receiver of a wireless communication system includes at least two receive antennas for receiving a target signal of a serving base station and interference signals of at least one neighbor base station; a channel estimator for estimating channels of the signals received through the receive antennas; and a detector for detecting the target signal using channel estimation values of the received signals.

According to another aspect of the present invention, the detector uses at least one of Multi-Input Multi-Output (MIMO) signal detection schemes including a Zero Forcing (ZF) linear detection scheme, a Minimum Mean Square Error (MMSE) linear detection scheme, a Vertical-Bell Lab layered Space Time (V-BLAST) scheme, and a minimum mean square error V-BLAST scheme.

According to a further aspect of the present invention, a method for canceling an interference signal in a receiver of a wireless communication system includes estimating channels of received signals when a target signal of a serving base station and interference signals of at least one neighbor base station are received through at least two receive antennas; and detecting the target signal using the channel estimation values of the received signals.

According to a further aspect of the present invention, a wireless communication system for canceling an interference signal includes a serving base station transmitting a target signal to a receiver; at least one neighbor base station transmitting interference signals to the receiver; and the receiver including at least two receive antennas and detecting the target signal by estimating channels of the target signal and the interference signals received through the receive antennas.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, an apparatus and method for canceling interference signals using multiple RX antennas in a receiver of a broadband wireless communication system will be described in detail.

A following description will be made about an interference cancellation using two RX antennas in a receiver of a wireless communication system based on an Orthogonal Frequency Division Multiplexing (OFDM) scheme. However, the present invention can also be applied to wireless communication systems using other multiple access schemes and having a plurality of RX antennas.

Figure 2:
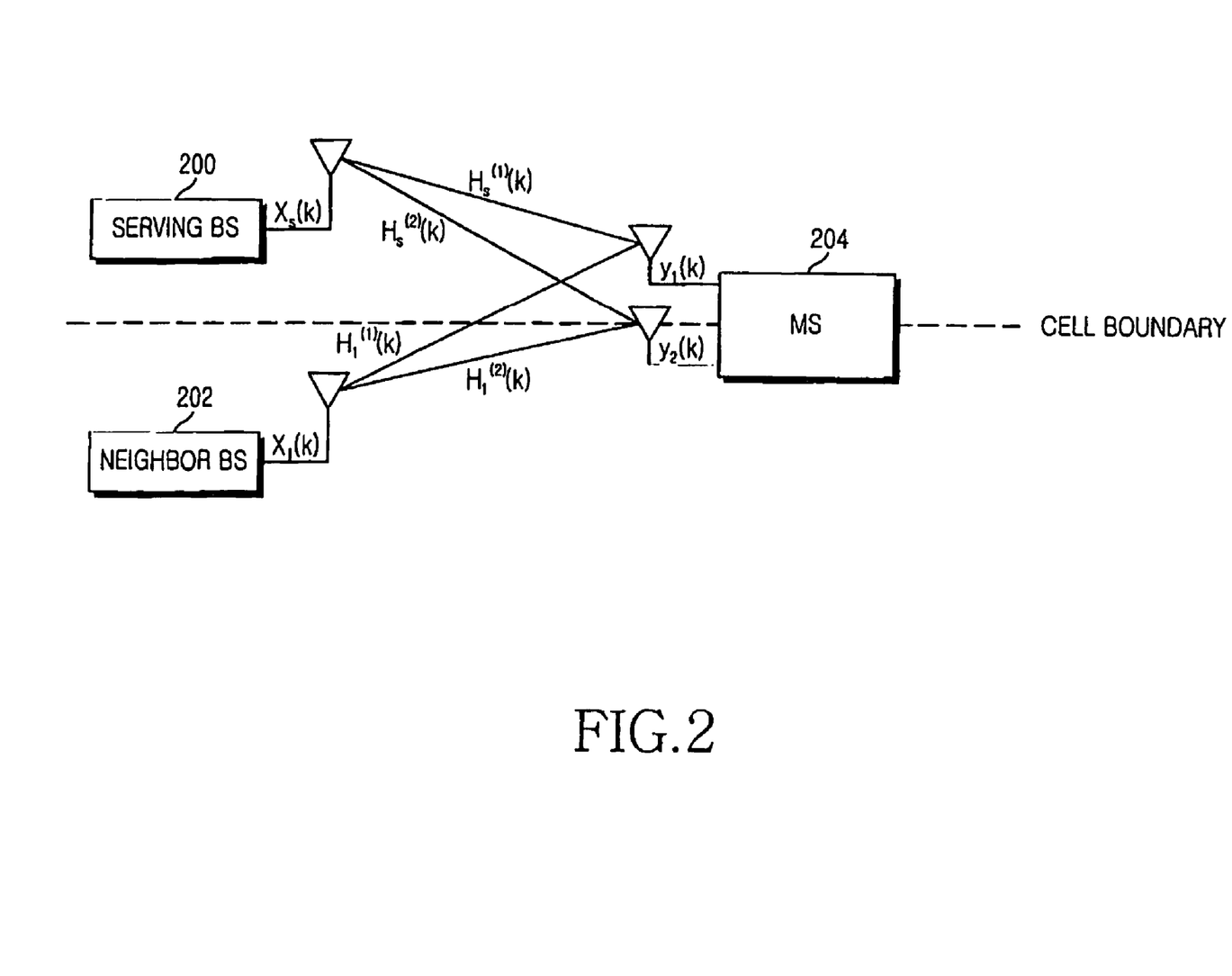
FIG. 2 is a block diagram of a wireless communication system according to the present invention.

FIG. 2 is a block diagram of a wireless communication system according to the present invention.

Referring to FIG. 2, an MS 204 is included in a cell area of a serving BS 200 and receives a target signal from the serving BS 200.

When the MS 204 moves into a cell boundary region, i.e., a handoff region between the serving BS 200 and a neighbor BS 202, it receives an interference signal from the neighbor BS 202, as well as a target signal from the serving BS 200.

Because the MS 204 has multiple RX antennas, it receives a signal expressed as Equation (5):

$$y_1(k) = h_s^{(1)}(k) \cdot x_s(k) + h_I^{(1)}(k) \cdot x_I(k) + n(k)$$

$$y_2(k) = h_s^{(2)}(k) \cdot x_s(k) + h_I^{(2)}(k) \cdot x_I(k) + n(k) \quad (5)$$

where $y_i(k)$ is an RX signal of an $i^{th}$ RX antenna of the MS 204, $h_s^{(i)}(k)$ is a channel component between the $i^{th}$ RX antenna of the MS 204 and the serving BS 200, $x_s(k)$ is a TX signal transmitted from the serving BS 200 to the MS 204, $h_I^{(i)}(k)$ is a channel component between the $i^{th}$ RX antenna of the MS 204 and the neighbor BS 202, $x_I(k)$ is a signal transmitted from the neighbor BS 202, and n(k) is Additive White Gaussian Noise (AWGN) corresponding to a $k^{th}$ subchannel.

The signal that the MS 204 receives using the multiple RX antennas as expressed in Equation (5) can be expressed as a matrix of Equation (6):

$$Y = \begin{bmatrix} y_1(k) \\ y_2(k) \end{bmatrix} = \begin{bmatrix} h_s(1)(k) & h_1(1)(k) \\ h_s(2)(k) & h_1(2)(k) \end{bmatrix} \cdot \begin{bmatrix} x_s(k) \\ x_1(k) \end{bmatrix} + \begin{bmatrix} n_1(k) \\ n_2(k) \end{bmatrix} = H \cdot X + N \quad (6)$$

where $y_i(k)$ is an RX signal of an $i^{th}$ RX antenna of the MS 204, $h_s^{(i)}(k)$ is a channel component between the $i^{th}$ RX antenna of the MS 204 and the serving BS 200, $x_s(k)$ is a TX signal transmitted from the serving BS 200 to the MS 204, $h_I^{(i)}(k)$ is a channel component between the $i^{th}$ RX antenna of the MS 204 and the neighbor BS 202, $x_I(k)$ is a signal transmitted from the neighbor BS 202, and $n(k)$ is an Additive White Gaussian Noise (AWGN) corresponding to a $k^{th}$ subchannel.

Equation (6) is equal to a typical Multi Input Multi Output (MIMO) model. That is, while the serving BS 200 and the neighbor BS 202 of the broadband wireless communication system, have a single TX antenna, respectively, the MS 204 simultaneously receives the signals from the serving BS 200 and the neighbor BS 202 using the multiple RX antennas. Therefore, the MS 204 has the same RX model as the MIMO system.

Therefore, the MS 204 can detect the target signal independently of the interference signal by using a channel component estimation method of the MIMO system. Examples of the channel component estimation method include a Zero Forcing (ZF) linear detection method, a Minimum Mean Square Error linear detection method, a Vertical-Bell Lab layered Space Time (V-BLAST) method, and a minimum mean square error VBLAST method.

An estimation of a target signal component using the zero forcing linear detection method in the broadband wireless communication system will be taken as an example.

Figure 3:
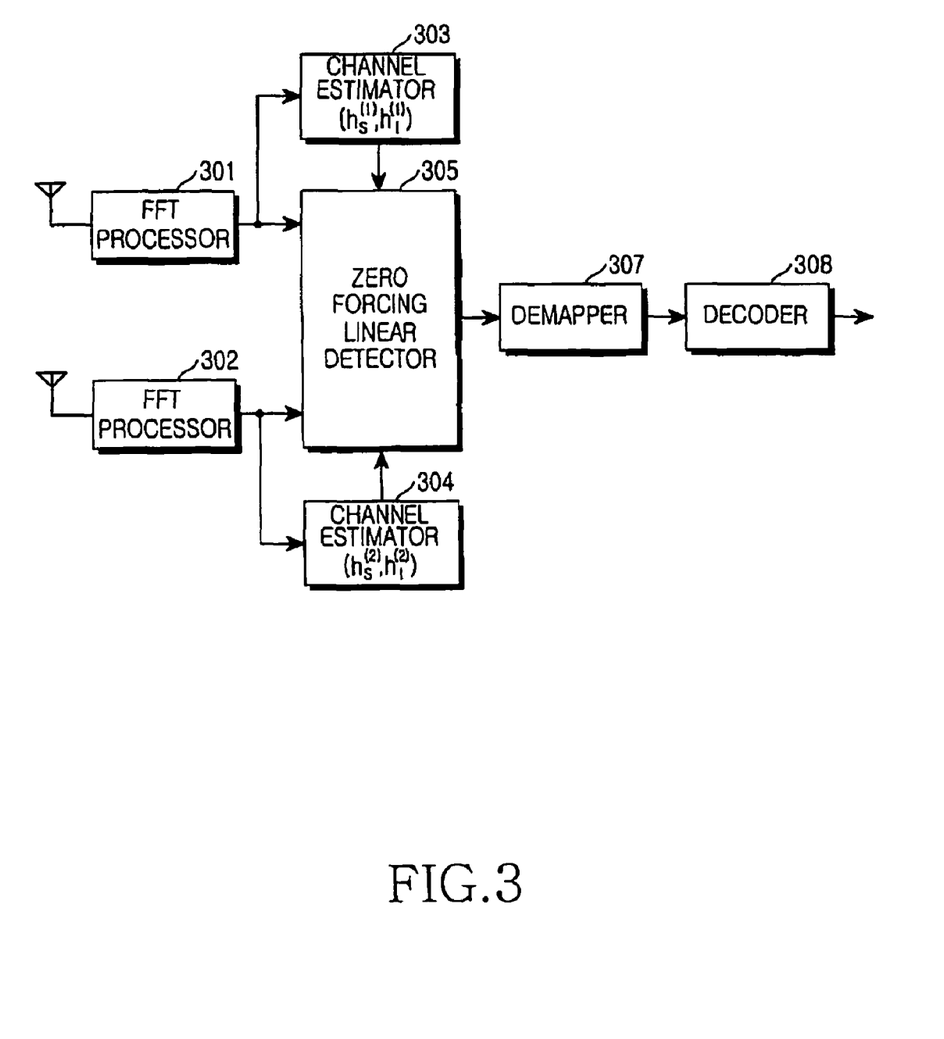
FIG. 3 is a block diagram of an MS for canceling interference between neighbor cells according to the present invention.

FIG. 3 is a block diagram of an MS for canceling interference between neighbor cells according to the present invention.

Referring to FIG. 3, the MS includes fast Fourier transform (FFT) processors 301 and 302, channel estimators 303 and 304, a zero forcing linear detector 305, a demapper 307, and a decoder 308.

The FFT processors 301 and 302 FFT-process time-domain signals received through a first antenna and a second antenna into frequency-domain signals.

The channel estimators 303 and 304 estimate the respective channels $h_s^{(1)}(k)$, $h_s^{(2)}(k)$, $h_I^{(1)}(k)$ and $h_I^{(2)}(k)$ using preamble signals received from the serving BS and the neighbor BS, which are contained in the signals provided from the FFT processors 301 and 302. The preamble signals contain reference signals such as pilot signals for channel estimation.

The zero forcing linear detector 305 generates a nulling vector using channel values estimated by the channel estimators 303 and 304, and estimates and detects the target signal component using the signal provided from the FFT processors 301 and 302 and the nulling vector. A structure of the zero forcing linear detector 305 is illustrated in FIG. 4.

Figure 4:
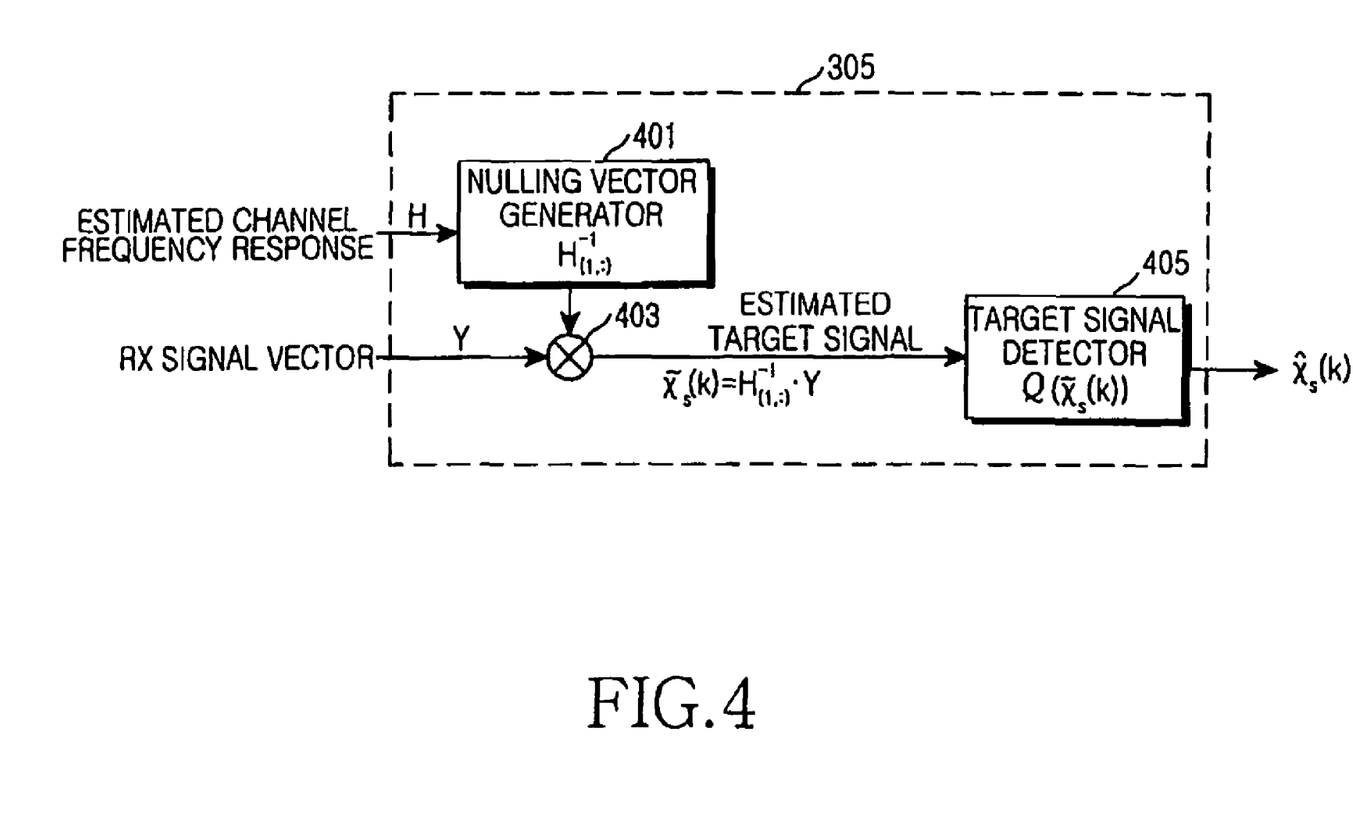
FIG. 4 is a block diagram of a zero forcing linear detector for canceling interference between neighbor cells according to the present invention.

FIG. 4 is a block diagram of the zero forcing linear detector for canceling the interference signal of the neighbor cell according to the present invention.

Referring to FIG. 4, the zero forcing linear detector 305 includes a nulling vector generator 401, a multiplier 403, a target signal detector 405.

The nulling vector generator 401 generates the nulling vector for estimating and detecting only the target signal component using the channel values estimated by the channel estimators 303 and 304.

The multiplier 403 estimates the target signal of Equation (7) by multiplying the nulling vector provided from the nulling vector generator 401 by the FFT-processed RX signal provided from the FFT processors 301 and 302.

The target signal detector 405 receives the target signal $\tilde{x}_{(s)}(k)$ estimated by the multiplier 403 and detects the target signal by performing a signal decision operation expressed as Equation (7):

$$\tilde{x}_s(k) = h_{(1,:)}^{-1}(k) \cdot Y, \hat{x}(k) = Q(\tilde{x}_s(k)) \quad (7)$$

where $\tilde{x}_s(k)$ is an estimated component of the target signal, $h_{(1,:)}^{-1}(k)$ is the nulling vector and is a first row of an inverse matrix of a channel matrix H, $\hat{x}_s(k)$ is a detected component of the target signal, and $Q(x)$ is a signal decision operation based on a signal constellation.

The target signal can be detected by a hard decision, or can be detected by a soft decision in order to increase the performance of the decoder.

The demapper 307 extracts subcarriers loading real data from the output signals (i.e., subcarriers) provided from the zero forcing detector 305.

The decoder 308 restores information data by demodulating and decoding the data provided from the demapper 307 according to a corresponding Modulation and Coding Scheme (MCS) level.

Figure 5:
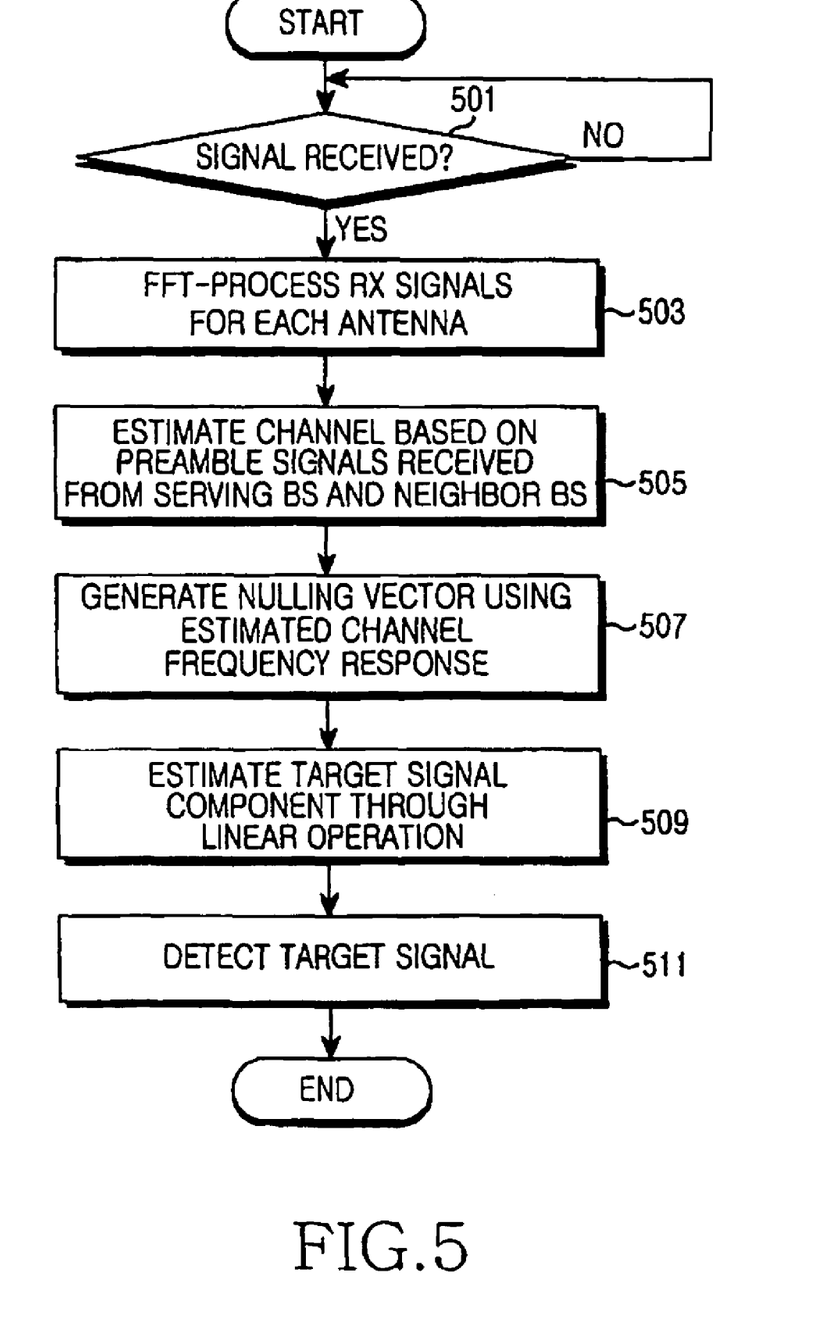
FIG. 5 is a flowchart illustrating a method for canceling interference between neighbor cells according to the present invention.

FIG. 5 is a flowchart illustrating a method for canceling the interference signal of a neighbor cell according to the present invention.

Referring to FIG. 5, in step 501, the MS determines if the signals are received from the serving BS and the neighbor BS through the multiple RX antennas of the MS.

In step 503, when the signal is received, the MS converts the time-domain signal into a frequency-domain signal by performing the FFT process on the signals received through the RX antennas.

In step 505, the MS estimates the respective channels $h_s^{(1)}(k)$, $h_s^{(2)}(k)$, $h_I^{(1)}(k)$ and $h_I^{(2)}(k)$ of the serving BS and the neighbor BS from the FFT-processed signals. At this point, the MS estimates the respective channels using the preamble containing the reference signal such as a pilot signal received from the serving BS and the neighbor BS.

In step 507, after estimating the channels of the serving BS and the neighbor BS, the MS generates the nulling vector for estimating the target signal component using the estimated channel values. Because the target signal component is detected independently of the interference signal component as expressed in Equation (8) by the linear detection method of the MIMO system, the MS need not actually estimate and detect the interference signal component. Therefore, the MS can estimate and detect the target signal only by calculating a first row of the inverse matrix of the entire channel required to calculate the target signal component, without calculating the inverse matrix of the entire channel H.

$$\tilde{X} = \begin{bmatrix} \tilde{x}_s(k) \\ \tilde{x}_I(k) \end{bmatrix} \quad (8)$$

$$= H^{-1} \cdot Y$$

$$= H^{-1} \cdot (H \cdot X + N)$$

$$= X + H^{-1} \cdot N$$

$$= X + N'$$

$$= \begin{bmatrix} x_s(k) + n'_1(k) \\ x_I(k) + n'_2(k) \end{bmatrix}$$

where $\tilde{x}_s(k)$ is the estimated value of the target signal, $\tilde{x}_I(k)$ is the estimated value of the neighbor signal, $H^{-1}$ is the inverse matrix of the channel, Y is the RX signal matrix, and X is the TX signal matrix.

In step 509, when the nulling vector is generated, the MS estimates the target signal component by the linear operation of the nulling vector and the FFT-processed RX signal using Equation (7).

In step 511, the MS detects the target signal using the estimated target signal component. At this point, the MS can detect the target signal using the hard decision or the soft decision.

The zero forcing linear detection method in the MS having multiple RX antennas has been described. When the minimum mean square error linear detection method is applied in order to improve the performance of the target signal detection, the MS estimates and detects the target signal component using Equation (9), instead of using the nulling vector of Equation (7).

$$\tilde{x}_s(k) = [(H^H H + \alpha I)^{-1} H^H]_{(1,:)} \cdot Y, \hat{x}_s(k) = Q(\tilde{x}_s(k)) \qquad (9)$$

where H is the matrix of the channel that the receiver receives through the multiple RX antennas, I is a 2×2 unit matrix, Y is the matrix of the received signal, $\hat{x}_s(k)$ is the detected component of the target signal, and Q(x) is the signal decision operation based on the signal constellation.

When the target signal is estimated and detected using Equation (9), power amplification of the noise component can be reduced compared with the zero forcing linear detection method.

The above description has been made about the MS having two BSs (the serving BS and the neighbor BS) and two RX antennas in a broadband wireless communication system. When the number of the interference signal components is $N_I$, the number $N_r$ of the RX antennas is set to $(N_I+1)$ and the MS can estimate and detect the target signal component using the same method even though the matrixes of Equations 6, 7 and 9 are expanded to $[N_r \times (N_I+1)]$ as given by Equation (10).

$$Y = \begin{bmatrix} y_1(k) \\ y_2(k) \\ \vdots \\ y_{N_1}(k) \end{bmatrix} \qquad (10)$$

$$= \begin{bmatrix} h_s^{(xs)}(k) & h_{l_1}^{(xs)}(k) & \cdots & h_{l_S}^{(xs)}(k) \\ \vdots & \vdots & \ddots & \vdots \\ h_s^{(xs)}(k) & h_{l_1}^{(xs)}(k) & \cdots & h_{l_S}^{(xs)}(k) \end{bmatrix} \cdot \begin{bmatrix} x_s(k) \\ x_{l_1}(k) \\ \vdots \\ x_{l_{N_r}}(k) \end{bmatrix} + \begin{bmatrix} n_1(k) \\ n_2(k) \\ \vdots \\ n_{N_r}(k) \end{bmatrix}$$

$$= H \cdot X + N$$

where $N_r$ is the number of the RX antennas and $N_I$ is the number of the interference signal components.

Meanwhile, when the number $N_r$ of the RX antennas is different from the number of the RX signals (=(number ($N_I$) of the interference signals)+(number (1) of the target signals), specifically when the number $N_r$ of the RX antennas is greater than the number of the RX signals ($N_r > (N_I+1)$), the MS estimates and detects the target signal according to the signal detection method of the MIMO system. A diversity gain corresponding to the number ($N_r - (N_I+1)$) of the residual antennas other than the RX antennas used to detect the target signals occurs. Thus, the target signals can be detected with better performance. The inverse matrix operation for estimating the target signals is changed into a pseudo-inverse operation.

When the number $N_r$ of the RX antennas is less than the number of the RX signals ($N_r < (N_I+1)$), the MS selects an upper (N−1) number of interference signals by comparing the interference signal components, and estimates and detects the target signals in the above-described manner.

As described above, the broadband wireless communication system detects the target signal component independently of the interference signal component by the MIMO detection method using multiple RX antennas. Therefore, it is possible to reduce error propagation caused by incorrect estimation and detection of the interference signal. In addition, time delay for detecting/restoring/removing the interference signal does not occur. Moreover, the need for additional buffers can be prevented. Consequently, the increase of hardware complexity can be prevented.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A receiver of a wireless communication system, comprising:
    at least two receive antennas for receiving a target signal of a serving base station and interference signals of at least one neighbor base station;
    a channel estimator for estimating channels of the signals received through the receive antennas; and
    a detector for detecting the target signal using channel estimation values of the received signals,
    wherein the detector uses a multi-input multi-output (MIMO) signal detection scheme, and
    wherein when a number of the received signals is greater than a number of the receive antennas, the detector compares powers of the interference signals, selects a number from high-powered interference signals that is one less than the number of the receive antennas, and detects the target signal using the MIMO signal detection scheme, and
    wherein when the number of the received signals is equal to the number of the receive antennas, the detector detects the target signal using the MIMO signal detection scheme.

2. The receiver of claim 1, wherein the channel estimator estimates the channels of the received signals using a reference signal contained in the signals received from the serving base station and the neighbor base station.

3. The receiver of claim 1, wherein the MIMO signal detection scheme includes at least one of a zero forcing linear detection scheme, a minimum mean square error (MMSE) linear detection scheme, a vertical-Bell lab layered space time (V-BLAST) scheme, and a minimum mean square error V-BLAST scheme.

4. The receiver of claim 3, wherein when the zero forcing linear detection scheme is used, the detector comprises:
    a nulling vector generator for generating a nulling vector for estimating the target signal using the channel estimation values of the received signals;
    a multiplier for estimating the target signal by multiplying the received signals by the nulling vector; and
    a target signal detector for detecting the target signal by performing a signal decision operation on the estimated target signal.

5. The receiver of claim 1, wherein the detector detects the target signal using a hard decision or a soft decision.

6. A method for canceling an interference signal in a receiver of a wireless communication system, comprising the steps of:
    estimating channels of received signals, when a target signal of a serving base station and interference signals of at least one neighbor base station are received through at least two receive antennas;

detecting the target signal using the channel estimation values of the received signals,
comparing a number of the received signals with a number of the receive antennas;
when the number of the received signals is greater than the number of the receive antennas:
　calculating and comparing powers of the interference signals,
　selecting a number from high-powered interference signals that is one less than the number of the receive antennas, and
　estimating the target signal using the selected interference signals; and
when the number of the received signals is equal to the number of the receive antennas, estimating the target signal,
wherein the target signal is estimated and detected by applying a multi-input multi-output (MIMO) signal detection scheme to the channel estimation values of the received signals.

7. The method of claim 6, wherein the channels of the received signals are estimated using a reference signal contained in the signals received from the serving base station and the at least one neighbor base station.

8. The method of claim 6, wherein the MIMO signal detection scheme includes at least one of a zero forcing linear detection scheme, a minimum mean square error (MMSE) linear detection scheme, a vertical-Bell lab layered space time (V-BLAST) scheme, and a minimum mean square error V-BLAST scheme.

9. The method of claim 6, wherein the target signal is detected using a hard decision or a soft decision.

10. The method of claim 6, wherein when the MIMO signal detection scheme utilizes a zero forcing linear detection scheme, estimating the target signal comprises:
　generating a nulling vector for estimating the target signal using the channel estimation values of the received signals;
　estimating the target signal by multiplying the received signals by the nulling vector; and
　detecting the target signal by performing a signal decision operation on the estimated target signal.

11. A wireless communication system for canceling an interference signal, comprising:
　a serving base station transmitting a target signal to a receiver;
　at least one neighbor base station transmitting interference signals to the receiver; and
　the receiver including at least two receive antennas and detecting the target signal by estimating channels of the target signal and the interference signals received through the receive antennas,
　wherein the receiver uses a multi-input multi-output (MIMO) signal detection scheme, and
　wherein when a number of the received signals is greater than a number of the receive antennas, the receiver compares powers of the interference signals, selects a number from high-powered interference signals that is one less than the number of the receive antennas, and detects the target signal using the MIMO signal detection scheme, and
　wherein when the number of the received signals is equal to the number of the receive antennas, the detector detects the target signal using the MIMO signal detection scheme.

12. The wireless communication system of claim 11, wherein the MIMO signal detection scheme includes at least one of a zero forcing linear detection scheme, a minimum mean square error (MMSE) linear detection scheme, a vertical-Bell lab layered space time (V-BLAST) scheme, and a minimum mean square error V-BLAST scheme.

13. The wireless communication system of claim 11, wherein when the MIMO signal detection scheme utilizes a zero forcing linear detection scheme, the receiver generates a nulling vector for estimating the target signal using the channel estimation values of the received signals, estimates the target signal by multiplying the received signals by the nulling vector, and detects the target signal by performing a signal decision operation on the estimated target signal.

* * * * *